(12) United States Patent
Bose

(10) Patent No.: US 11,336,552 B2
(45) Date of Patent: May 17, 2022

(54) DATA CENTER TROUBLESHOOTING MECHANISM

(71) Applicant: Hewlett Packard Enterprise Development LP, Houston, TX (US)

(72) Inventor: Anuradha Arabinda Bose, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 49 days.

(21) Appl. No.: 16/795,309

(22) Filed: Feb. 19, 2020

(65) Prior Publication Data

US 2021/0258238 A1    Aug. 19, 2021

(51) Int. Cl.
*H04L 43/10* (2022.01)
*H04L 41/0631* (2022.01)
*H04L 43/50* (2022.01)
*G06F 9/455* (2018.01)
*H04L 43/0817* (2022.01)

(52) U.S. Cl.
CPC .......... *H04L 43/10* (2013.01); *G06F 9/45512* (2013.01); *H04L 41/0631* (2013.01); *H04L 43/0817* (2013.01); *H04L 43/50* (2013.01)

(58) Field of Classification Search
CPC . H04L 43/10; H04L 41/0631; H04L 43/0817; H04L 43/50; G06F 9/45512
See application file for complete search history.

(56) References Cited

U.S. PATENT DOCUMENTS

| | | | |
|---|---|---|---|
| 7,284,165 B2 | 10/2007 | Auvenshine et al. | |
| 8,107,381 B2 | 1/2012 | Qian et al. | |
| 10,797,792 B1* | 10/2020 | Momtahan | H04B 10/25 |
| 2013/0083693 A1 | 4/2013 | Himura et al. | |
| 2013/0286857 A1* | 10/2013 | Qian | H04L 43/0823 370/244 |
| 2017/0171055 A1* | 6/2017 | Wang | H04L 41/0853 |
| 2020/0145299 A1* | 5/2020 | Do | H04L 67/10 |

FOREIGN PATENT DOCUMENTS

WO    2014/094821 A1    6/2014

OTHER PUBLICATIONS

Guo et al., "Pingmesh: A Large-Scale System for Data Center Network Latency Measurement and Analysis", SIGCOMM '15, Aug. 17-21, 2015, 14 pages.

* cited by examiner

*Primary Examiner* — Shirley X Zhang
(74) *Attorney, Agent, or Firm* — Jaffery Watson Mendonsa & Hamilton

(57) ABSTRACT

A system to facilitate troubleshooting a hardware device in a network switching fabric is described. The system includes a processor and a machine readable medium storing instructions that, when executed, cause the processor to receive a message from a hardware device indicating that a problem has been detected at the device, perform a troubleshooting operation to determine the problem at the hardware device and generate a report including the results of the troubleshooting operation.

20 Claims, 6 Drawing Sheets

DATA CENTER TROUBLESHOOTING MECHANISM

BACKGROUND

Data centers provide a pool of resources (e.g., computational, storage, network, etc.) that are interconnected via a communication network. In modern data center network architectures a network switching fabric typically serves as the core component that provides connectivity between the network resources, and facilitates the optimization of server to server (e.g., east-west) traffic in the data center. Such switching fabrics may be implemented using a software-defined transport fabric that interconnects a network of resources and hosts via a plurality of top of rack network (TOR) fabric switches.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
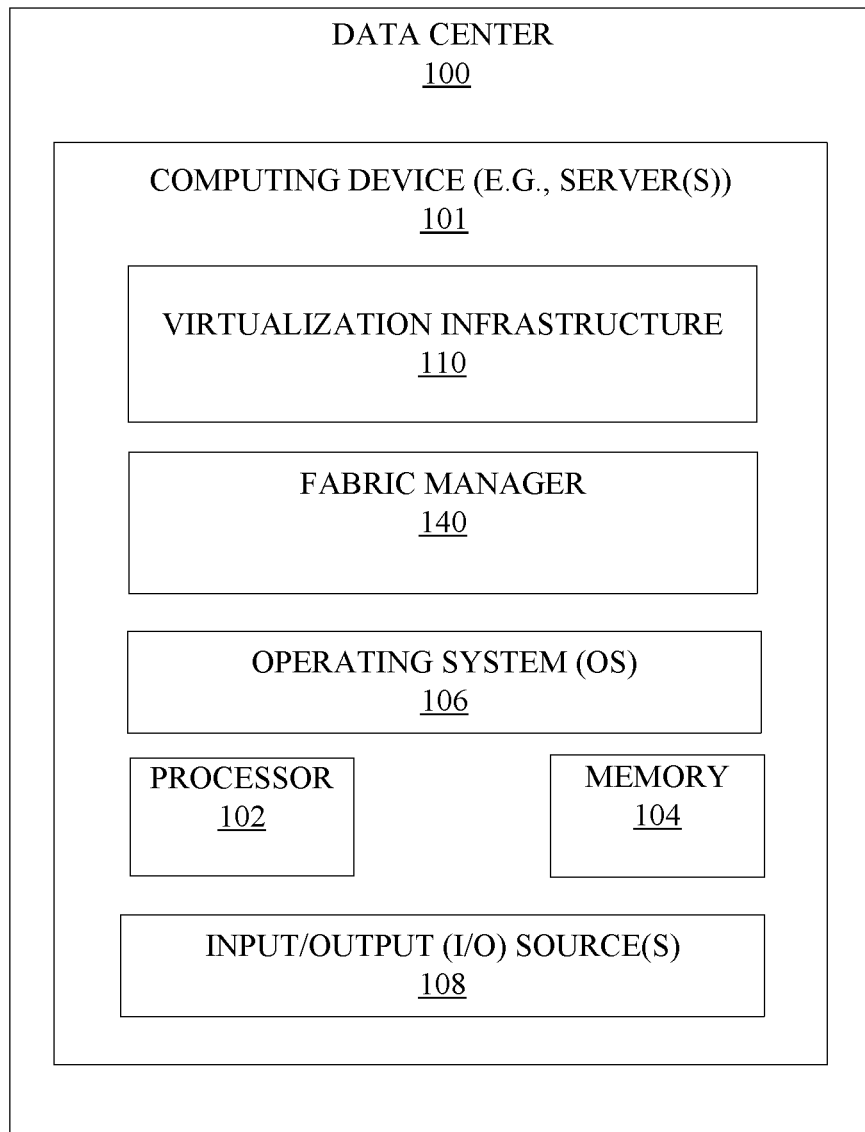
FIG. 1 illustrates one embodiment of a system employing a data center.

The connection of network resources via a switching fabric is implemented using infrastructure cabling to provide a physical connection of hardware devices (e.g., servers, storage and switches) for workload deployment of a data center. Thus, it is important for a data center fabric manager to identify whether a port at an infrastructure device (e.g., switch, server, storage, etc.) is (e.g., passing data traffic) operating properly, as well as diagnose a problem upon a determination as to why the port is not operating properly. Additionally, it is important that the fabric manager determine how to remedy the problem. Conventional fabric management systems may identify whether or not a port is communicating. However, such systems are unable to automatically diagnose or fix the problem automatically even if possible. Thus a system administrator (or operator) is required to manually perform a series of commands on different hardware to understand the cause of an issue at a hardware device.

In embodiments, a mechanism is provided to facilitate automatic troubleshooting of problems within a switching fabric. In such embodiments, a message is received from a hardware device within the fabric indicating that a problem has been detected and one or more troubleshooting operations are performed to determine the problem at the hardware device. In additional embodiments, a report is generated that including the results of the troubleshooting operation.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization of a plurality of host resources (or virtualization hosts) included within data center 100. In one embodiment, virtualization infrastructure 110 is implemented via a virtualized data center platform (including, e.g., a hypervisor), such as VMware vSphere or Linux Kernel-based Virtual Machine. However other embodiments may implement different types of virtualized data center platforms. Computing device 101 also facilitates operation of a network switching fabric. In one embodiment, the network switching fabric is a software-defined transport fabric that provides connectivity between the host resources within virtualization infrastructure 110.

Figure 2:
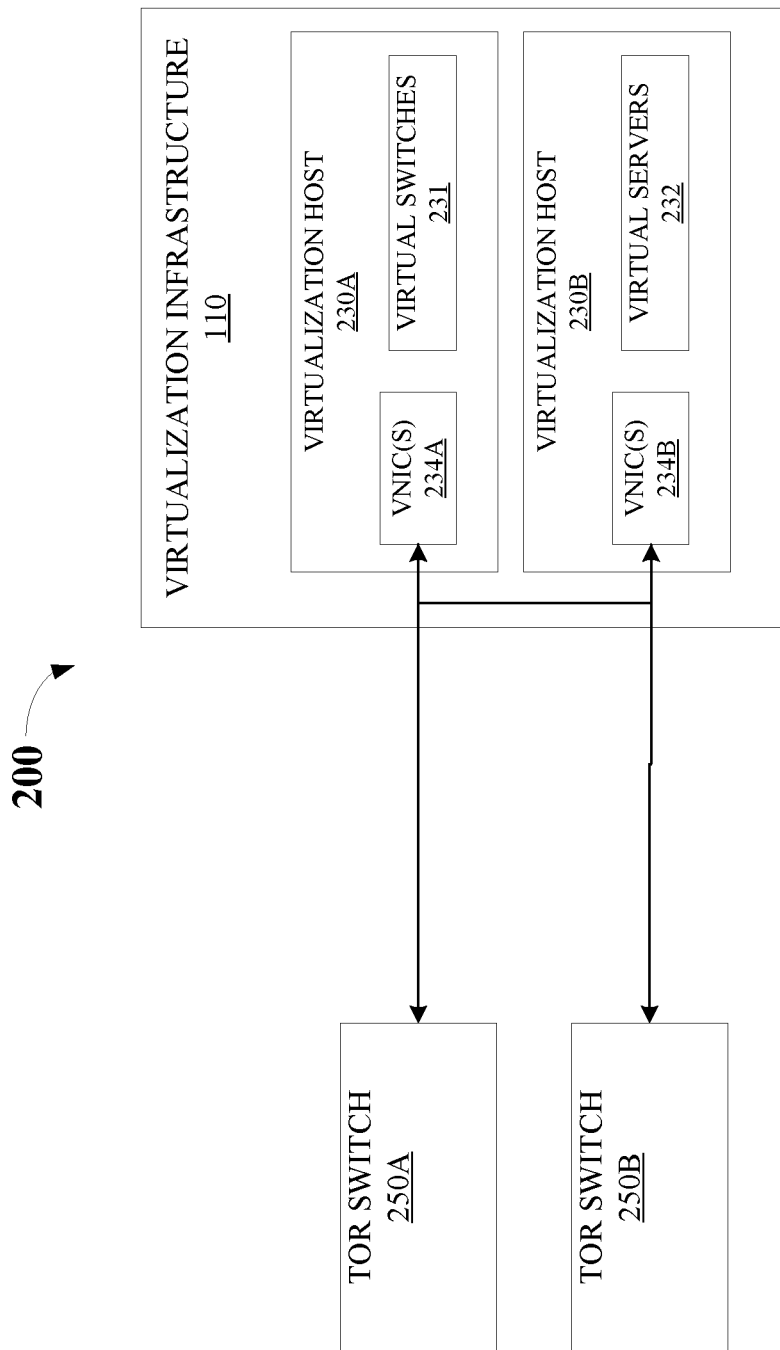
FIG. 2 is a block diagram illustrating one embodiment of a network switching fabric.

FIG. 2 is a block diagram illustrating one embodiment of a network switching fabric (or fabric) 200. As shown in FIG. 2, fabric 200 includes a plurality of top of rack (TOR) switches 250 (e.g., 250A & 250B) coupled to virtualized hosts 230 within virtualization infrastructure 110. TOR switches 250 are network switches that handle operations, including Layer 2 and Layer 3 frame and packet forwarding and data center 100 bridging.

In one embodiment, a virtualization host 230 may provide switching resources. In such an embodiment, a TOR switch 250 may be coupled to one or more virtual switches via one or more virtual network interface cards (VNICs) 234. For instance, TOR switch 250A may be coupled to virtual switches 231 via VNICs 234A within host 230A. In such an embodiment, a TOR switch 250 and switch virtualization host 230A may include a plurality of physical switching ports.

In a further embodiment, each switch port may be coupled to a neighboring device (e.g., switch port neighbors). A TOR switch 250 may also be coupled to one or more servers within a host 230 via VNICs 234. For example, TOR switch 250B may be coupled to virtual servers 233 within host 230B via VNICs 234B. In one embodiment, one or more of virtual servers (or compute units) 232 at host 230B may be coupled to virtual switches 231 at host 230A. Thus, one or more physical devices at host 230B may be switch port neighbors with switch ports at host 230A.

Figure 3:
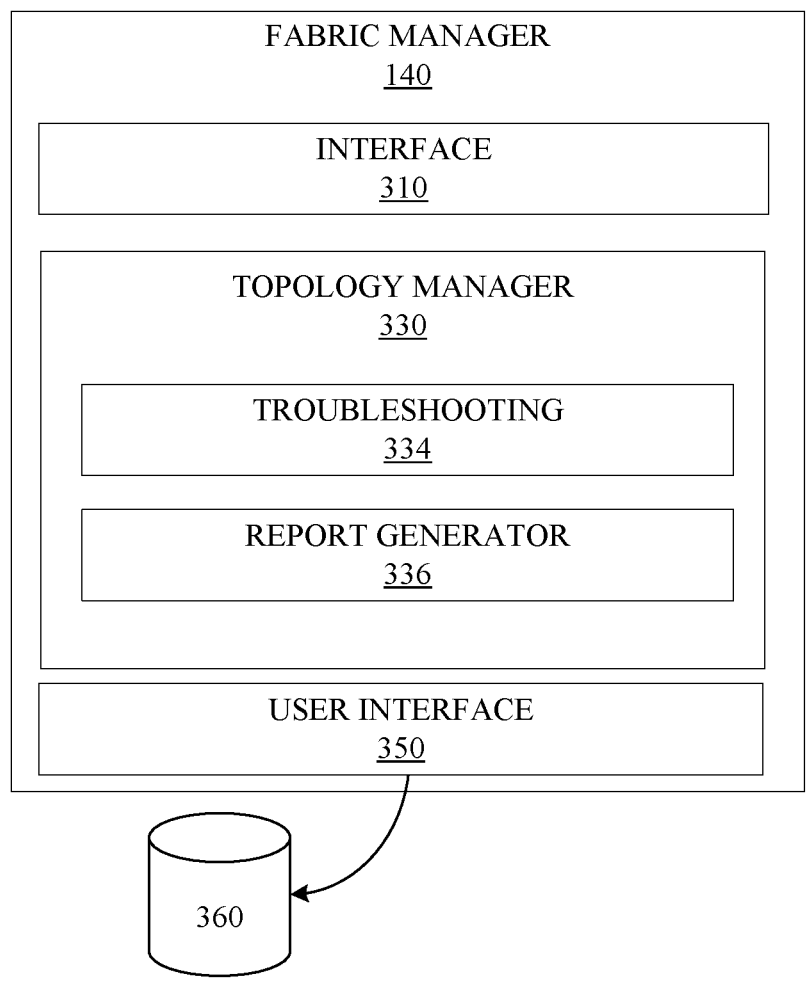
FIG. 3 is a block diagram illustrating one embodiment of a fabric manager.

Referring back to FIG. 1, a fabric manager 140 is included within computing device to manage fabric 200. FIG. 3 is a block diagram illustrating one embodiment of fabric manager 140. As shown in FIG. 3, fabric manager 140 includes an interface 310 that is configured to communicate with virtualization infrastructure 110 regarding virtualization hosts 230. In one embodiment, interface 310 is implemented as a Representational State Transfer (REST) application program interface (API) for fabric manager 140. Fabric manager 140 also includes a topology manager 330 to manage the topology of network switching fabric 200.

According to one embodiment, topology manager 330 performs a topology analysis of switching fabric 200. In such an embodiment, topology manager 330 maintains configuration information for fabric 200, which is a mapping of device connections within fabric 200. For example, the configuration information may include information regarding all of the physical connections between virtualization hosts 230, as well as TOR switches 250 shown in FIG. 2. In a further embodiment, the configuration information is generated each time a new connection is provided in fabric 200, and is stored in database 360.

Topology manager 330 includes a troubleshooting manager 334 that is implemented to perform one or more troubleshooting operations to detect a problem that may affect the health status of switching fabric 200, and a report generator 336 that generates a report of the results of the troubleshooting analysis. For example, troubleshooting manager 334 may receive a message from a switch indicating that there is an issue with the port counters at the switch, or that a link status is down. In response, troubleshooting manager 334 performs an analysis of the switch port connections to determine whether there is a problem, and a problem type upon a determination that there is a problem.

Figure 4:
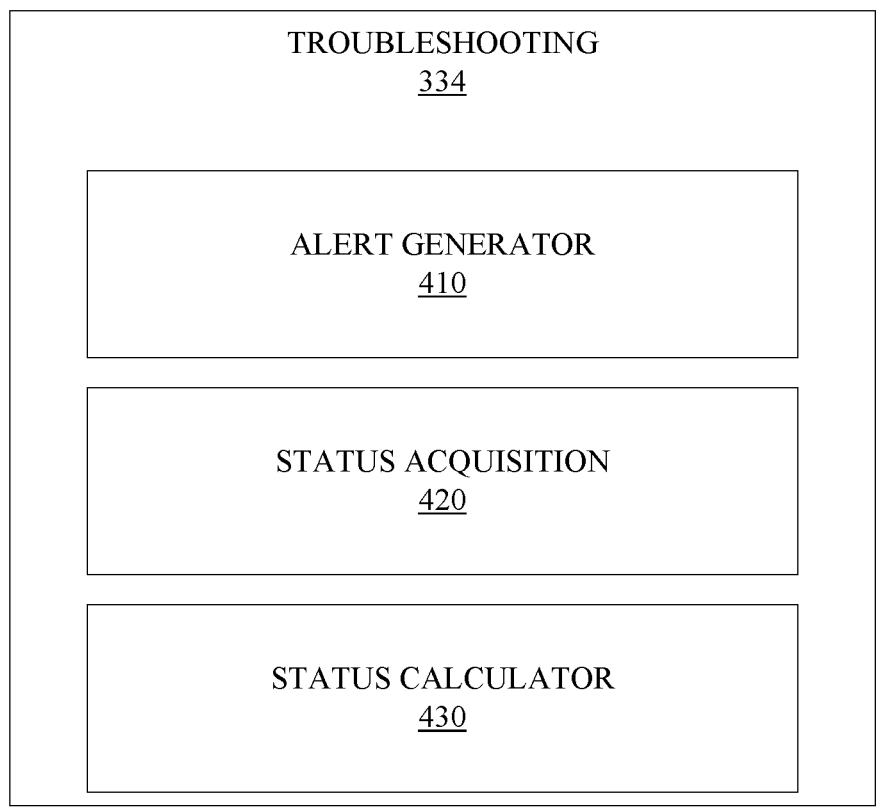
FIG. 4 is a block diagram illustrating one embodiment of a troubleshooting manager.

FIG. 4 is a block diagram illustrating one embodiment of troubleshooting manager 334, including an alert generator 410, status acquisition engine 420 and status calculator 430. Alert generator 410 generates and transmits an alert upon detection of a problem by topology manager 330. As discussed above, a problem may be detected upon receiving a switch message indicating that there is a connection issue. In one embodiment, the alert is transmitted to a user interface 350 within fabric manager 140 to alert a data center administrator (or operator).

Once the alert is generated, status acquisition engine 420 analyses one or more switch ports associated with the detected problem and acquires diagnostic data (or snapshot diagnostic information) associated with the hardware port and one or more switch port neighbor devices connected to the hardware device via the port. According to one embodiment, the snapshot diagnostic information acquired from the hardware port includes details regarding a downlink interface and a VLAN configured on the port received directly from the hardware device. In such an embodiment, snapshot diagnostic information is acquired by performing hardware specific command line interfaces (CLIs), which provide details of port link status, enable/disable status, as well as any other codes associated with the particular interface. For Link Aggregation group (LAG) interfaces, information regarding the associated Lagged ports, the associated interfaces, and up or down statuses is provided.

In a further embodiment, the snapshot diagnostic information is acquired by determining the switchport neighbor (e.g., server) associated with the hardware port configuration. In such an embodiment, this information is retrieved from database 360 and includes operating system, firmware version, power status details, etc. Once this information is retrieved, status acquisition engine 420 accesses (e.g., logs into) the switchport neighbor via a remote management console associated with the switchport neighbor and acquires an Ethernet interface for the associated VLAN via a media access control (MAC) address. In one embodiment, the switchport neighbor MAC address is retrieved from database 360. However in other embodiments, the switchport neighbor MAC address obtained from MAC Tables stored at a TOR switch 250.

After logging in into the switchport neighbor, status acquisition engine 420 collects the interface operation status (e.g., up or down). In one embodiment, the operation status indicates whether network traffic is being transmitted between a device port and a switchport neighbor (e.g., traffic working or not working). Upon determining that the operation status of the interface is down, status acquisition engine 420 transmits a command to bring the status up (e.g., activate) in order to remedy the status. However if the status continues to show as being down, the data is subsequently included in the report. Table 1 includes one embodiment of status information that may be included in a report.

TABLE 1

| Failure Condition | Sub-condition | Note | Action |
|---|---|---|---|
| Traffic not working | Configuration issue, vlan is not provisioned on the switch | Collect diagnostic data from the Fabric Manager database | Resubmit the task to push this vlan configuration down on |

TABLE 1-continued

| Failure Condition | Sub-condition | Note | Action |
|---|---|---|---|
| | | and determine the vlan configuration exists. | the switch. |
| | Downlink interface down on the switch | Collect the data as noted above from the switch and the server | Present to the user |
| Traffic is working but the Alert manager shows the alert. (Alert Reporting issue) | Check if the downlink interface is up on the switch. If yes, do the ping test. If ping succeeds, recalculate the port health status (up or down). | Should be able to recalculate the health status of the connection. No need to touch the switch configuration. | Fabric Manager recalculates the port status and the alert manager takes the action to clear false alerts. |

In a further embodiment, status acquisition engine 420 retrieves the configuration information associated with the switch hardware from database 360. In this embodiment, status calculator 430 compares the current snapshot diagnostic information with the retrieved configuration information in order to determine a difference between the snapshot diagnostic information and configuration information.

In yet a further embodiment, status acquisition engine 420 performs a ping test between the server and the switch. In such an embodiment, the ping test is performed when the server is powered on and a downlink interface on the server is up. At this time, the goal of the ping test is to verify whether the port is passing the network traffic or whether the problem with status reporting is from the switch or at the management software itself.

In a further embodiment, the ping test may be performed between a downlink interface on the server and a TOR switch 250, or a server connected to the TOR switch 250. For example, since the Ethernet interface is known from the diagnostic data the Internet Protocol (IP) address of the Ethernet network interface on the server may be obtained (e.g., via OS commands/tools). Similarly, CLI commands may be performed on a TOR switch 250 to retrieve details about TOR switch configuration for the associated port interface, which will provide the IP address of the uplink interface on the TOR switch 250 switch for this same VLAN.

Subsequently, a ping command may be performed between IP address of the server interface to the IP address of the interface on TOR switch 250. Upon a determination that the ping test passes, downlink interface information and the TOR configuration is reported in the snapshot diagnostic information and fabric manager 140 is automatically notified with the updated port statuses in order to accurately report the hardware status. Subsequently alert generator 410 clears the alert and the success is flagged in the report. Upon a determination that the ping test fails (e.g., the two IPs cannot ping each other), the failure is included in the report for manual intervention to correct issues with manual configuration.

Once troubleshooting has been completed, report generator 336 (FIG. 3) provides a report of the troubleshooting results. In one embodiment, report generator 336 transmits the report is transmitted to user interface 350. In this embodiment, the report may include the snapshot diagnostic information (e.g., port link statuses, power statuses, etc.) and/or any determined differences between the snapshot diagnostic information and configuration information for the switch. In other embodiments, the report may be generated as a text file or table. In a further embodiment, report generator 336 may report a VLAN and lag configuration for a port and if mismatched.

In such an embodiment, the VLAN configuration may be automatically redeployed to fix the detected problem. Automatic redeployment is performed by submitting a configuration task or command to push the VLAN configuration with the port information to the hardware switch. In a further embodiment, the success may flagged once the original problem is troubleshooted and fixed.

Figure 5:
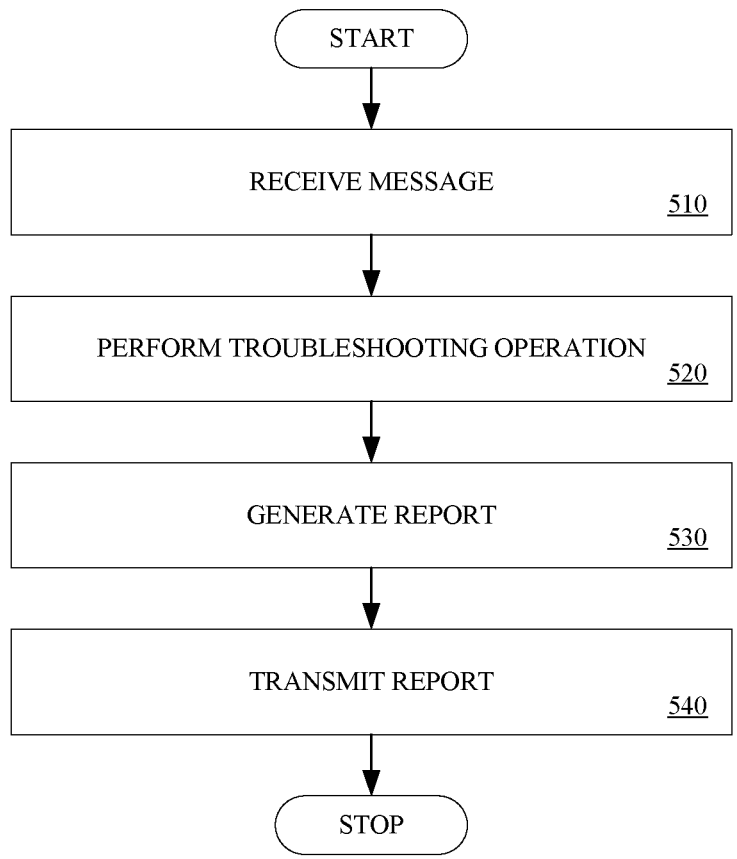
FIG. 5 is a flow diagram illustrating one embodiment of a method for troubleshooting a hardware device.
Figure 6:
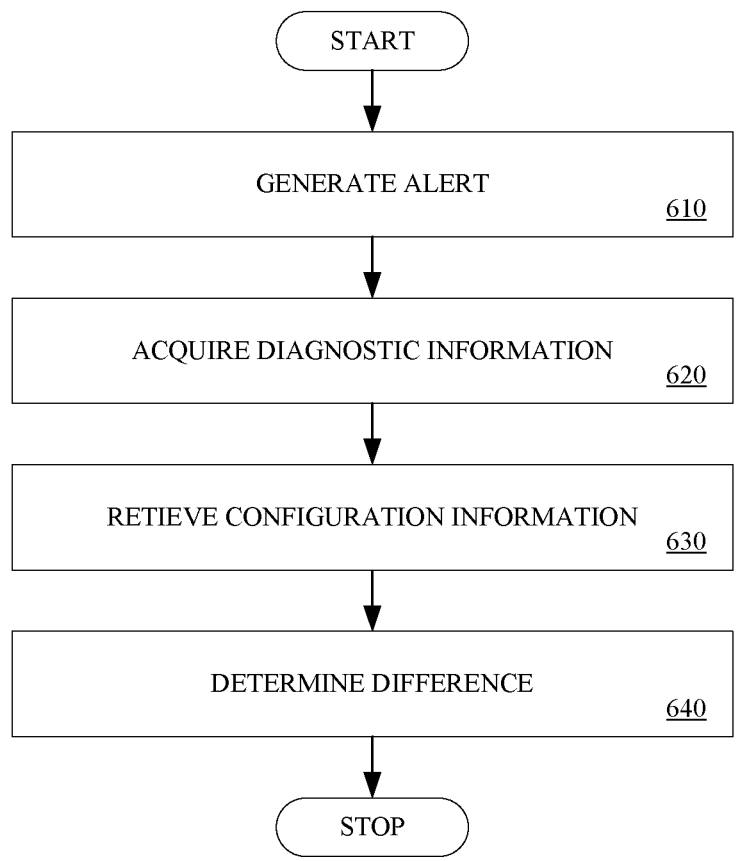
FIG. 6 is a flow diagram illustrating one embodiment of a method for performing a troubleshooting operation.

FIG. 5 is a flow diagram illustrating one embodiment of a method for troubleshooting a hardware device within a network switching fabric. At processing block 510, a message is received from a hardware device (e.g., switch). As mentioned above, the message may indicate that a problem has been detected at one or more ports at the hardware device. At processing block 520, a troubleshooting operation is performed. FIG. 6 is a flow diagram illustrating one embodiment of a method for performing a troubleshooting operation.

At processing block 610, an alarm is generated and transmitted for display at a user interface upon receiving the message from the device. At processing block 620, snapshot diagnostic information associated with the device is acquired. As discussed above, the snapshot information includes information associated with a hardware switch port, as well as information associated with devices connected to that switch port. At processing block 630, the configuration information for the hardware device is retrieved. At processing block 640, the snapshot diagnostic information and configuration information are compared to determine whether there is a difference. In one embodiment, a difference between the snapshot diagnostic information and configuration information indicates that a change has occurred at the switch port.

Referring back to FIG. 5, a report is generated after the troubleshooting process has been completed, at processing block 560. As discussed above, the report includes the diagnostic information and/or any determined differences between the results of the snapshot diagnostic information and configuration information. At processing block 570, the report is transmitted to the user interface.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate troubleshooting a hardware device in a network switching fabric, comprising:
   a processor; and
   a non-transitory machine-readable medium storing instructions that, when executed, cause the processor to execute a fabric manager to:
      receive a message from a hardware device indicating that a problem has been detected at the hardware device;
      perform a troubleshooting operation to determine the problem at the hardware device, including:
         acquiring snapshot diagnostic information comprising at least details regarding a downlink interface and a virtual local area network (VLAN) configuration on a port received directly from the hardware device by accessing the port through a device coupled to the hardware device via the port to determine an operation status of an interface associated with a port of the hardware device and devices coupled to the port;
         comparing the snapshot diagnostic information with configuration information associated with the hardware device to determine a difference between the snapshot diagnostic information and the configuration information, wherein the configuration information comprises information regarding a mapping of connections to the hardware device; and
         performing a ping test between the hardware device and devices coupled to the port; and
      generate a report including the results of the troubleshooting operation.

2. The system of claim 1, wherein the diagnostic information is acquired by performing a command line interface at the hardware device to receive a status of the port.

3. The system of claim 2, wherein the diagnostic information is acquired by determining a switchport neighbor associated with the port and accessing the switchport neighbor to acquire an interface.

4. The system of claim 3, wherein the troubleshooting operation further comprises determining a status of the interface from the switchport neighbor.

5. The system of claim 3, wherein the troubleshooting operation further comprises transmitting a command to activate the status of the interface upon up determining that the status interface is down.

6. The system of claim 5, wherein the troubleshooting operation further comprises generating an alert to indicate that the problem has been detected at the hardware device.

7. The system of claim 6, wherein the instructions, when executed, cause the processor further to transmit the report.

8. The system of claim 1, wherein performing the troubleshooting operation further comprises retrieving configuration information associated with the hardware device.

9. The system of claim 1, wherein the ping test is performed to verify whether the port is passing network traffic.

10. A method to facilitate troubleshooting a hardware device in a network switching fabric, comprising:
    receiving a message from a hardware device indicating that a problem has been detected at the hardware device;
    performing a troubleshooting operation to determine the problem at the hardware device, including:
       acquiring snapshot diagnostic information comprising at least details regarding a downlink interface and a virtual local area network (VLAN) configuration on a port received directly from the hardware device by accessing the port through a device coupled to the hardware device via the port to determine an operation status of an interface associated with a port of the hardware device and devices coupled to the port;
       comparing the snapshot diagnostic information with configuration information associated with the hardware device to determine a difference between the snapshot diagnostic information and the configuration information, wherein the configuration information comprises information regarding a mapping of connections to the hardware device; and
       performing a ping test between the hardware device and devices coupled to the port; and
    generating a report including the results of the troubleshooting operation; and
    automatically redeploying the VLAN configuration to correct the problem.

11. The method of claim 10, wherein the diagnostic information is acquired by performing a command line interface at the hardware device to receive a status of the port.

12. The method of claim 11, wherein acquiring the diagnostic information comprises determining a switchport neighbor associated with the port and accessing the switchport neighbor to acquire an interface.

13. The method of claim 12, wherein the troubleshooting operation further comprises determining a status of the interface from the switchport neighbor.

14. The method of claim 13, wherein the troubleshooting operation further comprises transmitting a command to activate the status of the interface upon up determining that the status interface is down.

15. The method of claim 14, wherein the troubleshooting operation further comprises generating an alert to indicate that the problem has been detected at the hardware device.

16. A non-transitory machine-readable medium storing instructions which, when executed by a processor, cause the processor to:
  receive a message from a hardware device indicating that a problem has been detected at the hardware device;
  perform a troubleshooting operation to determine the problem at the hardware device, including:
    acquiring snapshot diagnostic information comprising at least details regarding a downlink interface and a virtual local area network (VLAN) configuration on a port received directly from the hardware device by accessing the port through a device coupled to the hardware device via the port to determine an operation status of an interface associated with a port of the hardware device and devices coupled to the port;
    comparing the snapshot diagnostic information with configuration information associated with the hardware device to determine a difference between the snapshot diagnostic information and the configuration information, wherein the configuration information comprises information regarding a mapping of connections to the hardware device; and
    performing a ping test between the hardware device and devices coupled to the port; and
  generate a report including the results of the troubleshooting operation.

17. The non-transitory machine-readable medium of claim 16, wherein the diagnostic information is acquired by performing a command line interface at the hardware device to receive a status of the port.

18. The non-transitory machine-readable medium of claim 17, wherein the diagnostic information is acquired by determining a switchport neighbor associated with the port and accessing the switchport neighbor to acquire an interface.

19. The non-transitory machine-readable medium of claim 18, wherein the troubleshooting operation further comprises determining a status of the interface from the switchport neighbor.

20. The non-transitory machine-readable medium of claim 19, wherein the troubleshooting operation further comprises transmitting a command to activate the status of the interface upon up determining that the status interface is down.

* * * * *